United States Patent Office 3,761,472
Patented Sept. 25, 1973

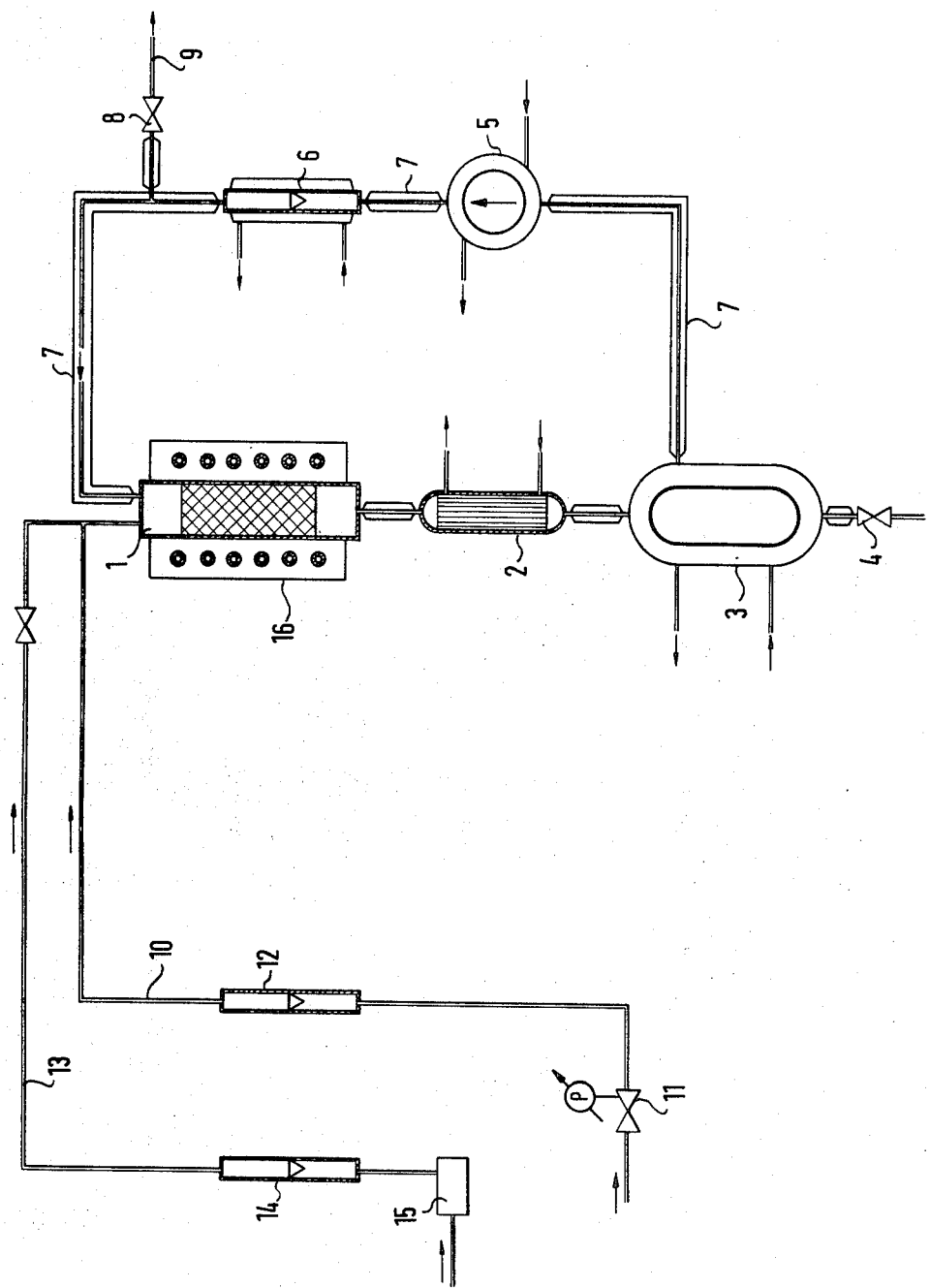

3,761,472
CONTINUOUS PROCESS FOR THE PRODUCTION OF CYANURIC CHLORIDE
Jean Riethmann, Allschwil, Basel-Land, Claude Gremmelmaier, Aesch, Basel-Land, and Leo Scheck, Benken, Basel-Land, Switzerland, assignors to Ciba-Geigy Corporation, Ardsley, N.Y.
Filed Feb. 3, 1971, Ser. No. 112,383
Claims priority, application Switzerland, Feb. 13, 1970, 2,099/70
Int. Cl. C07d 55/42
U.S. Cl. 260—248 C                         7 Claims

ABSTRACT OF THE DISCLOSURE

A process for the production of cyanuric chloride by trimerizing cyanogen chloride in the vapor phase wherein the cyanuric chloride formed is separated in liquid form and the residual gases containing untrimerized cyanogen chloride are returned into the reactor. The process affords a considerable improvement of the space time yield in the production of cyanuric chloride which is a valuable intermediate, for example, in the production of herbicides.

DESCRIPTION OF THE INVENTION

The present invention concerns an improved continuous process for the production of cyanuric chloride by trimerizing cyanogen chloride in the vapor phase in the presence of a catalyst and returning the residual gases containing unpolymerized cyanogen chloride into the reactor (recycling process).

Such processes are known and consist of recycling the unreacted monomeric cyanogen chloride and separating as a solid the cyanuric chloride which has been formed by the trimerization. Additional cyanogen chloride and preferably also chlorine are introduced to the gas which has been recylced to the reactor. The amount of gaseous cyanuric chloride (desired end product) contained in the recycled gases is very small, since the gases leaving the reactor consisting primarily of cyanuric chloride are greatly cooled in order to solidify the cyanuric chloride.

In the technical performance of this process, the attempt has been made to provide optimal conditions in every way so that the conversion and the yield of cyanuric chloride was as high as possible and the activity of the catalyst used was maintained as long as possible (long life) and was not gradually "poisoned."

A very important factor in attaining optimal results is the choice of the catalyst; according to the literature the following catalysts are suitable for the trimerization of cyanogen chloride in the gas phase:

Active carbon (German Pat. No. 833,490);

Active carbon purified by hydrochloric acid extraction (German Pat. 1,147.592);

The chlorides of the following elements: copper, zinc, lead, cadmium, aluminum, iron, boron, phosphorus, antimony, tin, titanium, silicon, individually or in mixture, on porous carriers such as active carbon, silica gel, silicates, zeolites (German Pats Nos. 805,513; 812,250);

Copper chloride and/or copper cyanide on silica gel or porous carriers;

Oxides of metals having an atomic number of from 25 to 30, individually or in mixture, applied to pumice (German Pat. No. 1,193,955);

Metals which have been vaporized onto active carbon in a vacuum, among others iron, aluminum, zinc, molybdenum, manganese, titanium, chromium, cobalt, nickel, copper (German Pat. No. 1,109,697);

"Equilibrium compositions" of aluminium chloride and/or iron chloride and of chlorides of metals of the groups I and II of the periodic system, on porous carriers such as active carbon, diatomaceous earth, silica gel (U.S. Pat. No. 3,257,399);

Very good results (high space time yield, high conversion to very pure cyanuric chloride, practically unlimited life of the catalyst) were obtained when, on the one hand, there was used as catalyst active carbon having an inner specific surface of at least 1000 m.$^2$/g. and which had been made free of injurious metallic compounds (in particular lead, cadmium, zinc and tin salts) by extraction with hydrochloric acid and/or sodium hydroxide solution, and, on the other hand, small amounts, e.g. 5%, of chlorine were added to the cyanogen chloride (U.S. Pat. 3,312,697).

Furthermore the gas to be trimerized, if at all possible, should not have any traces of moisture, thus it must be predried at a very high temperature.

The trimerization temperature should be between 220 and 500° C., preferably in the range of about 300 to 450° C.

At temperatures appreciably below 300° C., it is doubtful whether the trimerization is technically possible due to the low reaction rate. At temperatures in the vicinity of 500° C. and above, the conversion to cyanuric chloride is impaired by the fact that the reaction is reversible and with increasing temperature the equilibrium is shifted in favor of the cyanogen chloride. Furthermore, it has been found that at temperatures above 450° C. an active carbon catalyst irreversibly loses part of its activity.

In separating the solid cyanuric chloride from the gaseous reaction mixture, consisting substantially of cyanuric chloride, unreacted cyanogen chloride and chlorine as well as traces of by-products such as carbon dioxide, phosgene, hydrogen chloride, carbon tetrachloride and cyanogen, there are problems involved which are technically difficult to solve. It has been suggested to cool the gases in a type of ball mill by spraying the outside with water so that the cyanuric chloride is obtained by desublimation in solid, finely divided form (U.S. Pat. No. 3,256,070). Since the desublimator is in the form of a mill, formation of a crust on the cooling wall is hindered. Cyanuric chloride crusts are extremely hard and are in addition very poor heat conductors so that when they are formed, large cooling surfaces are necessary. In spite of this the process is very expensive since it requires an expensive apparatus which is mechanically driven and corrosion fast, and at the same time uses large amounts of energy and water for cooling.

In order to avoid the troublesome formation of a crust on the cooling surface, it has also been suggested to perform the desublimation in such a manner that the major part of the cyanuric chloride has precipitated before the vapors come in contact with the cold surfaces of the desublimation chamber (U.S. Pat. No. 2,734,058). In addition, a cold layer of an inert gas can be continually injected along the inner walls of the chamber. In spite of this, however, the solid cyanuric chloride cannot be completely kept away from the cooling surfaces; it is thus necessary to continually scrape it off by means of mechanical scrapers. Such mechanical methods are, however, only partially successful in keeping the cooling surface clean; they require much energy, are impaired by corrosion and/or erosion and are therefore prone to frequent repairs.

The separation of cyanuric chloride as a solid product has the general drawback that, on the one hand, due to the danger of decomposition by hydrolysis the product must be stored completely airtight and, on the other hand, a pulverulent and dusty substance which is irritating and toxic, must be handled under conditions which are hygenically aggravating.

It has also been suggested to bring the hot gas mixture (400° C.), consisting of cyanuric chloride and unreacted cyanogen chloride, into contact in a column with inert organic liquids such as toluene and xylene (as heat conductors), whereby the organic liquid vaporizes and cyanuric chloride condenses as a liquid. By cooling the vapors of the organic liquids, these are reliquefied and returned to the process (U.S. Pat. No. 2,742,977). Due to the reactivity of toluene and xylene with chlorine, this process is not suitable for the separation of cyanuric chloride from gas mixtures which in addition to cyanuric chloride and cyanogen chloride also contain chlorine.

Finally, it has been suggested to separate cyanuric chloride from the hot gas mixture by condensation and solution in organic solvents such as carbon tetrachloride. After cooling the solution, the crystallized cyanuric chloride is separated by filtration and the solvent is returned to the process (U.S. Pat. No. 3,338,898). The economical feasibility of this process is impaired by the following factors:

This process requires relatively complicated equipment, which in addition to the condensing chamber consists of at least one crystallization chamber, at least one filtration means, and an intense cooling gas condenser to separate the vaporized solvent from the uncondensed cyanogen chloride and chlorine gases. For a given amount of cyanuric chloride, large amounts of solvent must be circulated so that for one thing the separation apparatus must be relatively voluminous and for another larger losses of solvent are unavoidable. The cyanuric chloride obtained in this way must be freed of solvent by drying, which operation is complicated and expensive, considering the corrosive and toxic nature of the product.

By direct condensation and separation of liquid cyanuric chloride at temperatures between 145° C. (melting point) and 198° C. (boiling point), large amounts thereof are carried along with the uncondensed cyanogen chloride and chlorine gases, corresponding to the high vapor pressure of the cyanuric chloride. (The vapor pressure of cyanuric chloride at 150° C. is already 220 mm. Hg).

In all the previously known processes for the production of cyanuric chloride by trimerization of cyanogen chloride in the vapor phase, after passage over the catalyst the cyanuric chloride which is formed is completely separated from unreacted cyanogen chloride (and possibly chlorine) before the latter is returned to the process. For this reason, such processes must attempt to attain as high a conversion as possible in a single throughput.

Until now, a difficult problem was the elimination of expensive processing of the waste gases and their return to the cycle in a combination which does not poison or deactivate the catalyst, thus ensuring a very long period of operation for the installation.

It has now, surprisingly, been found that in the continuous trimerization of cyanogen chloride in the gas phase in the presence of active carbon as catalyst and in the presence of very small amounts of chlorine according to the process of U.S. Pat. No. 3,312,697, it is possible to separate the cyanuric chloride formed by the trimerization in liquid form, by cooling the reaction gases to a temperature between 145° C. (melting point of cyanuric chloride) and 198° C. (boiling point of cyanuric chloride), and to return the residual gases, consisting substantially of unreacted cyanogen chloride, chlorine and relatively large amounts (about 30 mol percent at a separation temperature of the cyanuric chloride of 150° C.) of gaseous cyanuric chloride as well as impurities (such as $COCl_2$, $CO_2$, $CCl_4$, $(CN)_2$, HCl, etc.), directly and without any intermediate treatment what ever to the continuous cycle of the trimerization process while adding new amounts of cyanogen chloride.

The fact that gases which are charged with large amounts of cyanuric chloride and with the other gaseous impurities mentioned above could be returned without even slightly impairing the trimerization kinetics (which would result in a decrease of the space time yield) could not be predicted, since it is known that in heterogeneous catalytic processes the reaction products usually adversely affect the reaction rate. Quite to the contrary, in the process according to the invention a very considerable improvement of the space time yield up to about 500% can be attained at high cycling rates. At the most feasible cycling rates, improvements of the space time yield of 200–300% are attained.

The possibility of a multiple increase in throughput indeed permits, in contrast to previous processes, the economical operation of the installation even when the catalyst is partially poisoned.

The condensable portion, depending on the vapor pressure, of the cyanuric chloride formed in the reactor used (contact reactor) is preferably separated as a liquid at a temperature around 155° C. The hot waste gases, which still contain about 30 mol percent of gaseous cyanuric chloride, are returned without any treatment preferably via a rotary compressor to the entrance of the contact reactor and the converted cyanogen chloride is continually replaced by a fresh supply of cyanogen chloride to the cycle. The supply can be regulated in a very simple manner by keeping a constant pressure in the trimerization apparatus. It has been found that there is no large accumulation of impurities in the cycle. Only the amounts of $CO_2$ and HCl increase appreciably, but even in high concentrations these have no poisonous effect on the catalyst. Traces of water or air in the system are reacted to form $CO_2$ and HCl, or to $COCl_2$ and $CO_2$ thus causing an accumulation thereof. By removal of a small portion of the gas stream, the concentration of $CO_2$ and other impurities can be regulated. The concentration of the small amount of chlorine in the cycle necessary to prevent poisoning of the catalyst is also maintained.

To ensure a practically unlimited life of the active carbon catalyst, it is thus advisable to perform the trimerization in the presence of small amounts of chlorine (about 5%) (cf. U.S. Pat. No. 3,312,697). For this purpose chlorine is admixed with the cyanogen chloride being added until the desired amount is in circulation. However, in order not to dilute the circulating gas mixture too greatly with chlorine, which would lead to a decrease in the space time yield, it is expedient to regulate the amount of chlorine in the cycle so that the concentration thereof at the entrance to the catalyst bed is very low, being about 5 mol percent.

The cyanogen chloride used in industry is usually produced by chlorinating hydrogen cyanide in aqueous medium and contains traces of impurities such as water and carbon dioxide (hydrolysis product from cyanogen chloride), which in practice are impossible to remove quantitatively. In addition, with the trimerization of the cyanogen chloride some side reactions take place, however only to a very limited extent. For these reasons, there are impurities in the circulating gas mixture, such as carbon dioxide, phosgene, hydrogen chloride, carbon tetrachloride and cyanogen. Experiments, however, have shown that none of these or other compounds which might be present cause a poisoning of the active carbon catalyst, a condition which makes the economical performance of the process possible. To be sure, cyanogen is known as catalyst poison, but it is formed only in extremely small and thus harmless quantities under the present conditions due to the fact that the chemical equilibriums $$(CN)_2 + Cl_2 \rightleftarrows 2ClCn$$
$$3ClCN \rightleftarrows (ClCN)_3$$

lie far over to the side of cyanogen chloride and cyanuric chloride.

In order to counteract an accumulation of by-products which are present in the cyanogen chloride or which are formed from them by chemical reaction in the catalyst reactor, a certain rinsing of the cycle is necessary. For this purpose a certain volume of gas adapted to the degree of contamination of the cyanogen chloride can be drawn off continuously or discontinuously at given intervals from the cycle and replaced by an adequate mixture of cyanogen chloride and chlorine. It has been found that when technical cyanogen chloride of the usual commercial grade is used, a very trifling amount of rinsing is sufficient, so that a reprocessing of the gas mixture removed from the cycle is not absolutely necessary and the gases may simply be destroyed. The losses thus caused are below 2%. Of course, even the cyanuric chloride and cyanogen chloride contained in the small gas stream which has been removed from the cycle can be processed, due to the small volume of gases to be treated, in relatively inexpensive apparatus and be utilized.

The space time yield depends on the gas volume cycled per time unit: the greater the volume of cycled gas, the greater is the space time yield. However, even with relatively low cycle rates very considerable improvements of the space time yield are attained. The relationship between the space time yield and the amount of gas circulated, when other conditions remain unchanged, is illustrated in the following table:

| Volume of cycled, uncondensed gas, liters/hour at 170° C. (1) | Volume of reacted gaseous cyanogen chloride, liters/hour at 170° C. (2) | Relationship of (1)/(2) | Space time yield, kg. of cyanuric chloride/liters of active carbon, × hour |
| --- | --- | --- | --- |
| 2.04 | 14.7 (24.9 g./h.) | 0.14 | 0.75 |
| 3.46 | 19.7 (33.8 g./h.) | 0.18 | 1.02 |
| 8.52 | 26.6 (45 g./h.) | 0.32 | 1.36 |

For the condensation of the cyanuric chloride, the reaction mixture can be cooled to any temperature above the melting point (145.7° C.) and below the boiling point (198° C.) of the cyanuric chloride. However, in order not to encumber the cycled gases with unnecessarily large amounts of cyanuric chloride, which at a given cycle rate (liters/hour) would lead to a decrease of the space time yield and thus to a loss of a considerable advantage of the process according to the invention, a condensation temperature near the melting point of the cyanuric chloride is preferred.

Compared with previously known processes the new process according to the invention has considerable advantages:

It requires a minimal expense for the separation of the cyanuric chloride. Instead of desublimation in expensive apparatus which is prone to repairs, or of a solvent extraction which subsequent crystallization and filtration, or of condensation in a column in the presence of a solvent, a conventional liquid condenser having a substantially more favorable heat exchange coefficient and a correspondingly smaller investment cost can be used. Furthermore the new process permits the obtention of liquid cyanuric chloride which can be handled simply and under absolutely hygienic conditions. Cyanuric chloride in liquid form can, for example, be used for the production of herbicides according to U.S. Pat. No. 2,891,855, or for the production of aqueous suspensions according to French Pat. No. 1,534,235, whereby the advantages of liquid measurement in continuous processes can be particularly utilized. Before further processing, liquid cyanuric chloride is easily handled by conventional means in heated iron containers and iron pipes.

In particular, however, the process according to the invention achieves an enormous improvement in the space time yield compared with all previously known processes. Thus, a space time yield of 1.36 kg. of cyanuric chloride per liter of catalyst and hour is attained compared with 0.49 kg. of cyanuric chloride per liter of catalyst and hour in the conventional procedure according to U.S. Pat. No. 3,312,697 without recycling and with a conversion of 95% in a single throughput. This is an improvement of 278%.

The new process also avoids the technical difficulties of the separation of solid cyanuric chloride and the entailed expenses. Because of this difficulty which rapidly increases with the volume of unreacted cyanogen chloride, in the previous processes as high a conversion as possible had to be attained in a single passage. Thus, in these processes, the catalyst had to be renewed as soon as a loss of activity of the catalyst caused a decrease in the conversion. In contrast to this, in the present process the catalyst can remain in action until an advanced degree of deactivation. In spite of this the desired production capacity can be maintained by an appropriate increase of the cycling rate. In this manner the removal of spent catalyst which is charged with poison can be limited to a minimum.

The accompanying drawing is a schematic representation of an installation for performing the process according to the invention:

The trimerization takes place in reactor 1, which is heated with the aid of a regulated oven 16 to the desired temperature off rom 300–450° C. The active carbon catalyst is in the lower part of the reactor, the upper part serving to preheat the gases. After leaving the reactor, the gases are cooled to 149–151° C. in cooler 2. The liquefied cyanuric chloride flows into a collecting main 3 which has also been heated by means of a double jacket to 149–151° C., from which it is discharged via heated valve 4, maintaining a constant level. The uncondensed gases are drawn off from the upper part of collecting main 3 by suction by means of circulating pump 5 and returned via flowmeter 6 into the reactor. The pipe 7 as well as the pump and the flowmeter 6 are heated to 170° C. The volume of gas required for rinsing the cycle can be drawn off at outlet 9 via heated valve 8. This same arrangement can also be used for the taking of samples for analysis of the cycling gases. The new supply of cyanogen chloride is fed into the reactor through pipe 10 via flowmeter 12 and pressure reducing vave 11. For this purpose the pressure in the apparatus is kept by means of pressure reducing valve 11 practically constant at 1 atmosphere absolute pressure and thereby continually replacing the cyanogen chloride which has been reacted and removed as liquid cyanuric chloride. During the start of the reaction as well as after or during the rinsing of the cycle, chlorine is fed into the apparatus through the pipe 13 and via flowmeter 14 and control valve 15 in the amounts required for a concentration at the entrance to the catalyst of, for example, 5 mol percent.

The following examples illustrate the process according to the invention.

Example 1

The above-described apparatus is charged with 14 g. (33 cm.$^3$) of granular active carbon which has been pretreated according to U.S. Pat. No. 3,312,697 and under the theregiven conditions. Then cyanogen chloride is introduced into the apparatus at an oven temperature of 360° C. and in the presence of 5 mol percent of chlorine, and trimerized. The cyanuric chloride which is formed is condensed at 149–151° C., and 2.04 liters/hour (measured at 170° C.) of uncondensed gases are returned by means of the pump to the reactor. Care is taken that the amount of chlorine being cycled is such that the chlorine constant at 5 mol percent (volume percent). Temperature of 390–425° C. are measured in the interior of the catalyst bed. 24.9 g. (14.7 l./h. at 170° C.) of cyanogen chloride are converted per hour to cyanuric chloride. 24.4 g./h. (98% yield) of very pure cyanuric chloride having a melting point of 145–146.5° C. are obtained in the collecting main. This corresponds to a space time yield of 0.75 kg. of cyanuric chloride per liter of active carbon and per hour.

For the removal of the by-products, from time to time small portions of gas are drawn off by suction at outlet 9. The cyanogen chloride and cyanuric chloride gas which is thus removed corresponds to 1–2% of the cyanogen chloride employed. The chlorine which is also drawn off is replaced each time by a new addition of chlorine in order to keep the amount of chlorine at the entrance to the catalyst at 5 mol percent. Analysis by gas chromatography and infra red spectroscopy of the gases removed showed in addition to cyanogen chloride, cyanuric chloride and chlorine, also carbon dioxide, phosgene, hydrogen chloride, carbon tetrachloride as well as traces of cyanogen.

After the test had been run for 223 hours without interruption, the activity of the catalyst had not diminished.

Example 2

After the time of 223 hours of the test described in Example 1, the volume of uncondensed gases recycled through the pump is increased from 2.04 to 3.46 liters/hour (measured at 170° C.). The catalyst from the test of Example 1 is used further. At temperatures of 390–430° C. measured in the interior of the catalyst bed and a concentration of chlorine at the entrance to the catalyst of 5 mol percent, 33.8 g./h. of cyanogen chloride (19.7 l./h. at 170° C.) are converted with more than 98% yield to pure cyanuric chloride. When 14 g. of active carbon having a specific weight of 0.42 are used, 33.2 g./h. of pure cyanuric chloride are obtained, which corresponds to a space time yield of 1.02 kg. per liter of active carbon and per hour.

The testing time for this example was 90 hours.

Example 3

After the additional 90 hours which passed in Example 2, the amount of gas recycled by the pump is raised to 8.52 liters/hour. The catalyst from the test in Example 1 is still used. At temperatures of 390–430° C. measured in the interior of the catalyst bed and a concentration of chlorine at the entrance to the catalyst of 6 mol percent, 45.0 g./h. (26.6 liters at 170° C.) of cyanogen chloride are converted with more than 98% yield to pure cyanuric chloride (yield 44.2 g./h.). After 70 more hours the test is stopped. The space time yield attained at this raised cycling rate of the gases is thus 1.36 kg. of cyanuric chloride per liter of active carbon and hour.

The catalyst was employed for a total of 383 hours without any loss of activity.

Example 4

In this example a test is described in which a small, constant flow of gas is continuously drawn off from the cycle in order to avoid accumulation in the cycle of the by-products mentioned. The cyanuric chloride contained in this gas stream which has been withdrawn is desublimated by cooling the gas stream to room temperature and thus is recovered as a solid.

The trimerization is performed essentially as described in Example 1.

After leaving the reactor, all of the reaction gases are cooled in cooler 2 to 149–151° and the condensed liquid cyanuric chloride is collected in collecting main 3 which is maintained at 149–151° with a thermostat. At outlet 9, by means of a suitable device, a small, constant gas stream of 295 parts by volume per hour (measured at 170°, 1 atm.) is removed from the cycle and conducted through a collecting main at room temperature to desublimate the cyanuric chloride. A constant flow of chlorine of 76 parts by volume (measured at 25°, 1 atm., corresponding to 0.22 parts by weight) is fed via control valve 15 into the reactor. In the presence of 14 parts by weight (33 parts by volume) of granular active carbon and at a cycling rate of 8200 parts by volume per hour of uncondensed gases (measured at 170°, 1 atm.), 39.6 parts by weight per hour of cyanogen chloride can be converted. The reactor is so heated that in the interior of the active carbon layer, temperatures of from 350 to 430° are obtained, depending on the location of the measurement in the layer.

The gases removed continuously at outlet 9 had the following average composition:

| | Mol percent |
|---|---|
| Cyanogen chloride | 50 |
| Cyanuric chloride | 29 |
| Chlorine | 12 |
| Carbon dioxide | 3.6 |
| Hydrogen chloride | 3.6 |
| Phosgene | 1.2 |
| Carbon tetrachloride | 0.3 |
| Cyanogen | 0.2 |

38.7 parts by weight of very pure cyanuric chloride per hour are obtained (yield 97.8%), 38.1 parts by weight being in liquid form and 0.6 parts by weight in solid form.

At the interruption of the test after 498 hours of operation, the catalyst still showed no loss of activity.

Space time yield: 117 parts by weight of cyanuric chloride per 1 part by volume of active carbon and per hour

What we claim is:

1. In a continuous process for the production of cyanuric chloride by trimerization of cyanogen chloride in the gas phase in the presence of trimerization catalysts at temperatures between 220 and 500° C in a cycling reactor, the improvement which comprises cooling the gas mixture leaving the reactor to a temperature between the melting point (145° C) and the boiling point of cyanuric chloride and thus separating in liquid form the major portion of the cyanuric chloride contained in the gas mixture, and returning to the cycle in the reactor without any intermediate treatment and with the addition of a fresh supply of cyanogen chloride, the remainder of the gases which besides the unconverted cyanogen chloride and small amounts of other gases also contain relatively large amounts of gaseous cyanuric chloride, corresponding to the vapor pressure of the cyanuric chloride at the said temperature 2. The process according to claim 1, wherein the gas mixture leaving the reactor is cooled to a temperature slightly above the melting point of the cyanuric chloride.

3. The process according to claim 1, wherein the trimerization in the gas phase is performed in the presence of at least 5 mol percent of chlorine, measured at the entrance to the reactor.

4. The process according to claim 1, wherein the trimerization is performed in the reactor at temperature between 300 and 450° C.

5. The process according to claim 1, wherein small portions are withdrawn continuously or discontinuously from the residual gas stream before a fresh supply of cyanogen chloride is added.

6. The process according to claim 5, wherein about 0.5–1 liter of gas is withdrawn per 100 liters of circulating gas and per hour.

7. The process according to claim 1, wherein the trimerization catalyst is an active carbon catalyst.

References Cited
UNITED STATES PATENTS

| | | | |
|---|---|---|---|
| 3,607,671 | 9/1971 | Riethmann et al. | 260—248 |
| 3,607,872 | 9/1971 | Riethmann | 260—248 |

JOHN M. FORD, Primary Examiner